(12) United States Patent
Diaz

(10) Patent No.: US 11,202,503 B1
(45) Date of Patent: Dec. 21, 2021

(54) DUAL TABLET AND DUAL SMARTPHONE HOLDER

(71) Applicant: Hugo Diaz, Doral, FL (US)

(72) Inventor: Hugo Diaz, Doral, FL (US)

(*) Notice: Subject to any disclaimer, the term of this patent is extended or adjusted under 35 U.S.C. 154(b) by 0 days.

(21) Appl. No.: 16/985,321

(22) Filed: Aug. 5, 2020

(51) Int. Cl.
| | | |
|---|---|---|
| *A47B 81/00* | (2006.01) | |
| *A47B 47/00* | (2006.01) | |
| *A47F 7/00* | (2006.01) | |
| *A47B 23/04* | (2006.01) | |
| *A47F 5/16* | (2006.01) | |

(52) U.S. Cl.
CPC ............. *A47B 81/00* (2013.01); *A47B 23/04* (2013.01); *A47B 47/0066* (2013.01); *A47F 7/0042* (2013.01); *A47F 2005/165* (2013.01)

(58) Field of Classification Search
CPC ..... A47B 81/00; A47B 47/0066; A47B 23/04; A47B 23/042; A47B 23/043; A47B 23/044; A47B 2033/046; A47B 2097/006; A47F 5/16; A47F 2005/165; A47F 7/0042; A47F 7/142; A47F 7/146; A47G 1/14; G09F 1/10
USPC .... 211/42, 55, 72, 40, 26.2, 41.7, 50, 41.11, 211/85.4; 40/124, 124.4, 745, 764; 248/441.1, 346.01, 346.03, 346.4, 346.5; 361/679.56; D14/447, 434, 251, 253
See application file for complete search history.

(56) References Cited

U.S. PATENT DOCUMENTS

| | | | | |
|---|---|---|---|---|
| 719,386 | A * | 1/1903 | Smith, Sr. ............ | A47B 23/042 248/451 |
| 1,006,486 | A * | 10/1911 | King ...................... | G03B 21/54 211/41.13 |
| 1,086,906 | A * | 2/1914 | Felten .................. | A47B 23/043 248/456 |
| 1,091,026 | A * | 3/1914 | Traugott ................ | B43L 25/10 211/69.4 |
| 1,768,675 | A * | 7/1930 | Egan ........................ | G09F 1/14 248/473 |
| 1,821,313 | A * | 9/1931 | Marsh ..................... | A47F 5/112 211/72 |
| 1,974,674 | A * | 9/1934 | Halladay ................ | B65D 5/504 206/315.2 |
| D161,138 | S * | 12/1950 | Shapiro ...................... | D6/682.4 |
| 2,550,857 | A * | 5/1951 | Overbaugh ............... | G09F 1/14 248/459 |
| 2,592,203 | A * | 4/1952 | Snyder ................. | A47J 37/0694 211/85.4 |
| 2,832,347 | A * | 4/1958 | Schade ................... | B42F 17/08 211/42 |
| 3,028,972 | A * | 4/1962 | Guillaumant ......... | A47J 43/287 211/41.11 |

(Continued)

*Primary Examiner* — Jennifer E. Novosad
(74) *Attorney, Agent, or Firm* — Ruben Alcoba, Esq.

(57) ABSTRACT

A dual tablet and dual smartphone holder that is a rectangular cuboid that defines an upper central slit, that holds two tablets that face in opposite directions, and that further defines a left upper slanted slit and a right upper slanted slit that run inward toward the upper central slit, the left upper slanted slit and the right upper slanted slit hold smartphones. The smartphones placed in the left upper slanted slit and the right upper slanted slit are at an angle that allows each smartphone to capture the image of a user that is placed before the screen of the smartphone when the rectangular cuboid is placed on a table or desk that is before the user.

4 Claims, 6 Drawing Sheets

(56) References Cited

U.S. PATENT DOCUMENTS

| | | | | |
|---|---|---|---|---|
| 3,282,437 A | * | 11/1966 | Hansen | A47F 7/0064 211/41.7 |
| 3,326,387 A | * | 6/1967 | Princevalle | A47J 47/16 211/41.11 |
| 3,666,115 A | * | 5/1972 | Turner | A47F 7/0042 211/50 |
| 4,099,624 A | * | 7/1978 | McKearin | A47B 65/00 211/42 |
| 4,163,497 A | * | 8/1979 | McEwen | B42F 17/12 211/11 |
| 4,295,623 A | * | 10/1981 | Schweizer | G11B 23/0236 211/170 |
| 4,592,471 A | * | 6/1986 | Bross | A47J 47/16 108/61 |
| 4,685,647 A | * | 8/1987 | Calhoun | B42F 17/16 248/444.1 |
| 5,012,937 A | * | 5/1991 | Owens | A47F 5/04 211/189 |
| D336,182 S | * | 6/1993 | Machut | D6/310 |
| 5,215,198 A | * | 6/1993 | Sutton | A47F 7/146 206/425 |
| 5,318,190 A | * | 6/1994 | Mason | A47F 7/0064 211/175 |
| 5,335,753 A | * | 8/1994 | Campbell | B25H 1/06 182/151 |
| D361,450 S | * | 8/1995 | Weatherby | D7/601 |
| 5,472,098 A | * | 12/1995 | Ho | A47B 23/042 211/189 |
| 5,794,796 A | * | 8/1998 | Weisburn | G11B 33/0461 206/307.1 |
| D405,115 S | * | 2/1999 | Stravitz | D19/90 |
| D416,119 S | * | 11/1999 | Newhall | D32/55 |
| 6,012,593 A | * | 1/2000 | Knittel | A47J 47/16 211/181.1 |
| 6,070,346 A | * | 6/2000 | Kowalczyk | G09F 1/14 211/189 |
| D469,277 S | * | 1/2003 | Vlaar | D14/447 |
| D470,360 S | * | 2/2003 | Stanco | 211/85.4 |
| 7,165,686 B2 | * | 1/2007 | Ito | G11B 33/0438 211/40 |
| 8,684,191 B2 | * | 4/2014 | Hosey | H05K 7/1424 211/41.17 |
| 8,727,142 B2 | * | 5/2014 | Shapiro | A47B 88/988 211/70.7 |
| 9,549,659 B2 | * | 1/2017 | Jensen | A47L 15/501 |
| 9,605,790 B1 | * | 3/2017 | Alonzo | F16M 13/00 |
| 10,334,969 B1 | * | 7/2019 | Roan | A47F 7/0014 |
| D856,320 S | * | 8/2019 | Li | D14/253 |
| D896,227 S | * | 9/2020 | Sjogren | D14/434 |
| 2002/0139762 A1 | * | 10/2002 | Kollegian | G11B 33/0472 211/40 |
| 2009/0101604 A1 | * | 4/2009 | Restis | A47L 19/02 211/41.2 |
| 2009/0179124 A1 | * | 7/2009 | Caplan | F16M 11/22 248/176.1 |
| 2009/0321605 A1 | * | 12/2009 | Petrie | F16M 13/00 248/452 |
| 2013/0277529 A1 | * | 10/2013 | Bolliger | F16M 13/00 248/676 |
| 2013/0321698 A1 | * | 12/2013 | Harold | H04N 5/2252 348/373 |
| 2016/0352118 A1 | * | 12/2016 | Huang | H02J 7/0042 |
| 2020/0333839 A1 | * | 10/2020 | Vidyasagaran | A47B 23/044 |

* cited by examiner

DUAL TABLET AND DUAL SMARTPHONE HOLDER

BACKGROUND

The present invention is directed a dual tablet and dual smartphone holder that allows an instructor to monitor students' participation in live online classes.

Due to the present pandemic, instructors and parents have seen the difficulty in monitoring students' participation in online classes.

The present invention is directed to a tool that can be used to present online materials to students while simultaneously monitoring the interaction of the students being presented with the materials.

Presently, when students are presented with online educational materials, students monitor the presenter's presentation with a communication device, yet the students do not have a second tool that allows them to simultaneously to take notes or research the presenter's presentation without losing focus.

The tool of the present invention also allows the presenter of the presentation to monitor the audience viewing the presentation in real time. The device allows the presenter of the presentation the luxury of having one communication device to publish the presentation, while simultaneously having another device that monitors the participants viewing the presentation. The beauty of the device is that the audience viewing the presentation is always on guard that the presenter is viewing each participant's participation.

The tool of the present invention further allows two participants, that are socially distanced, to use the device while maintaining their social distance. The tool is a dual tablet and dual smartphone holder that is placed on a central location of a table. The holder holds two tablets in a vertical position in a central location of the holder. The tablets placed in the holder are placed back to back so that each screen is projected outward from the central location of the holder. The holder also holds two smartphones. The smartphones rest on two slanted slots that are defined on the holder. Each slanted slot is at a location that is outward from the central location of the holder and each slanted slot points inward toward the central location. The screen of each smartphone placed in each slanted slot points outward from the central location so that any image captured by the screen can be seen by the presenter, ideally the image will be of the student viewing the presentation on the tablet, and the screen of each smartphone also serves as a writing tool or research tool that is used by the participant viewing the presentation.

It is foreseen that each tablet can also serve as the research or writing tool used by the student and that each smartphone can serve as the tool in which the presentation is seen.

The device of the present invention is a tablet and smartphone holder that allows two students to be socially distanced while receiving online classes.

For the foregoing reasons, there is a need for dual tablet and dual smartphone holder that can be used to enhance an online learning environment. The holder of the present invention promotes the interactive participation of students.

SUMMARY

The present invention is a dual tablet and dual smartphone holder that is used to promote an interactive online education.

The dual tablet and smartphone holder device comprises of a rectangular cuboid, wherein the top side and the bottom side of the rectangular cuboid define a rectangular aperture, the left side and right side of the rectangular cuboid define an upper central slit and an upper left slanted slit and an upper right slanted slit, the upper left slanted slit and the upper right slanted slit are defined at locations that are outward from the upper central slit, and the front side and the rear side of the rectangular cuboid are solid. The central slit is at a location that is centered between the front side and the rear side of the rectangular cuboid and it runs perpendicular to the top side of the rectangular cuboid.

An embodiment of the present invention further comprises of abridge, the bridge is placed within the central slit and the bridge defines an upper part that defines an upper channel. The bridge may have a left foot extension and a right foot extension that extend outward from the left side and right side of the rectangular cuboid.

An object of the present invention is to provide a tool that can be used to enhance an online education.

Another object of the present invention is to provide a tool that will promote social distancing.

A further object of the present invention is to provide a tool that will allow presenters an ability to monitor students' participation when they present an online presentation.

Yet still a further object of the present invention is to provide a tool that students can use while receiving an online education.

DRAWINGS

These and other features, aspects, and advantages of the present invention will become better understood with regards to the following description, appended claims, and drawings where:

DESCRIPTION

Figure 1:
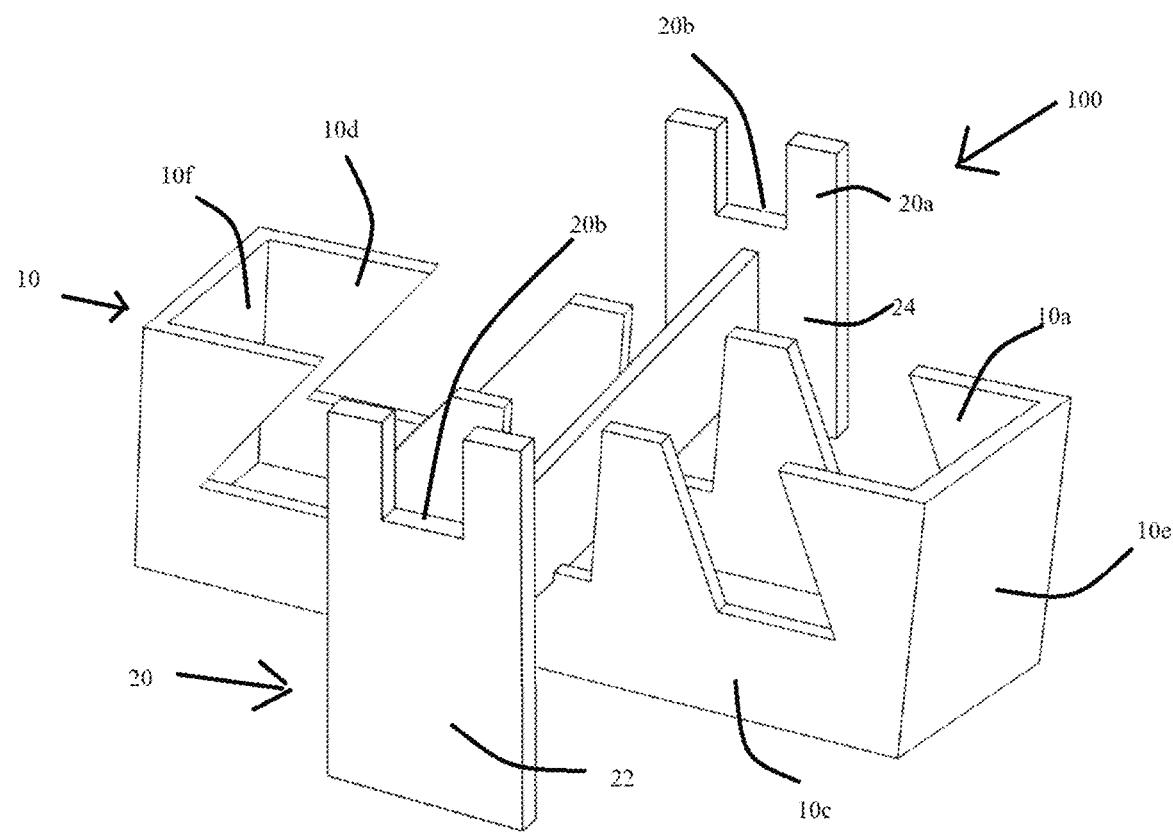
FIG. 1 shows a perspective view of the present invention.
Figure 2:
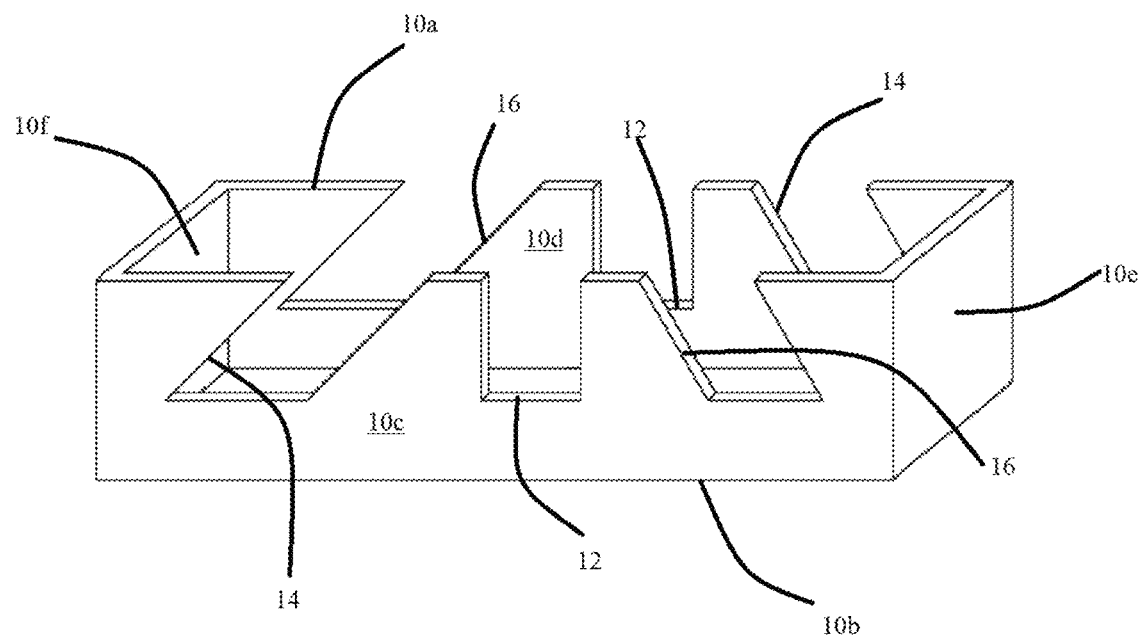
FIG. 2 shows a perspective view of the rectangular cuboid of the present invention.
Figure 3:
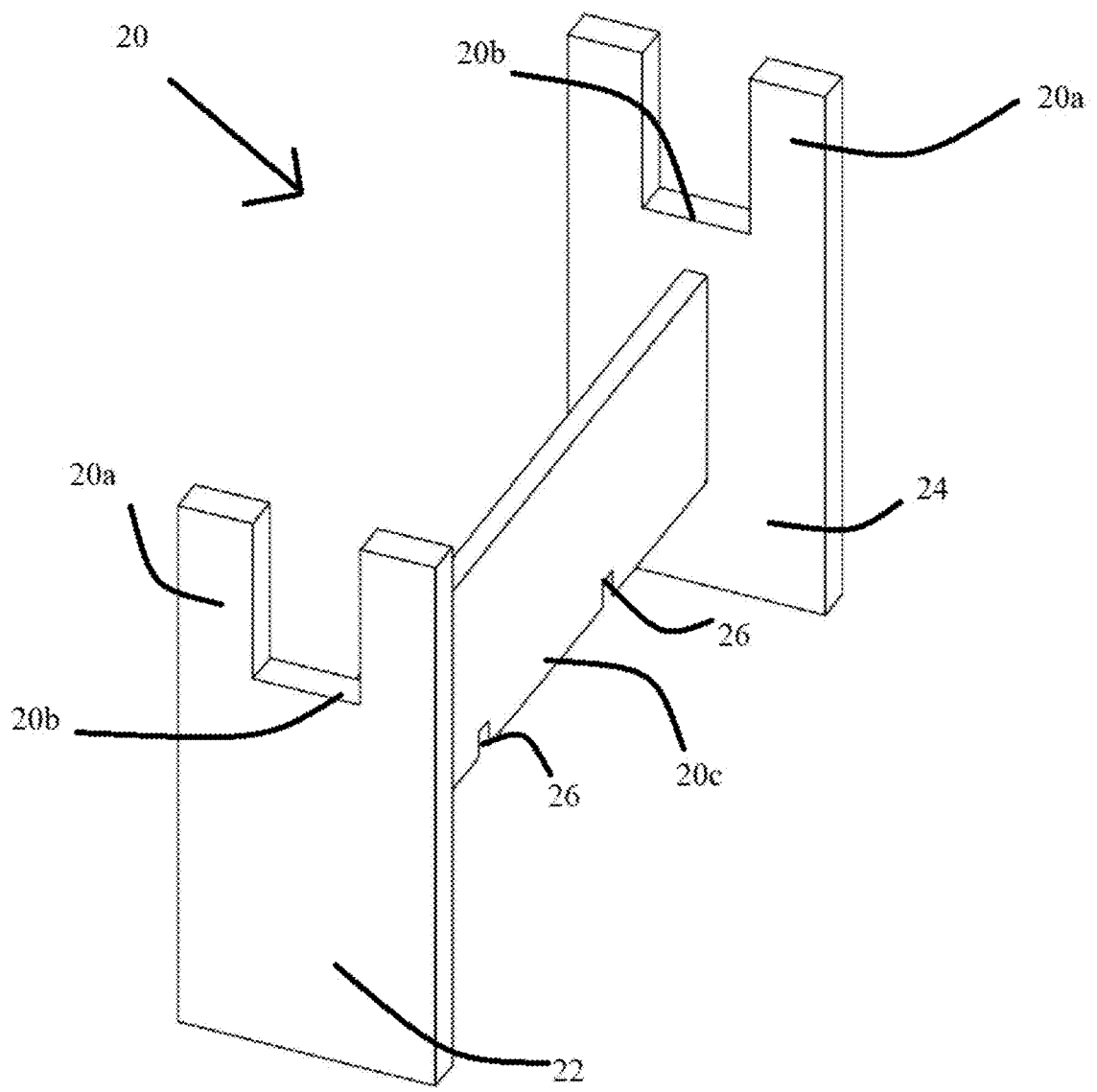
FIG. 3 shows a perspective view of an embodiment of the bridge of the present invention.
Figure 4:
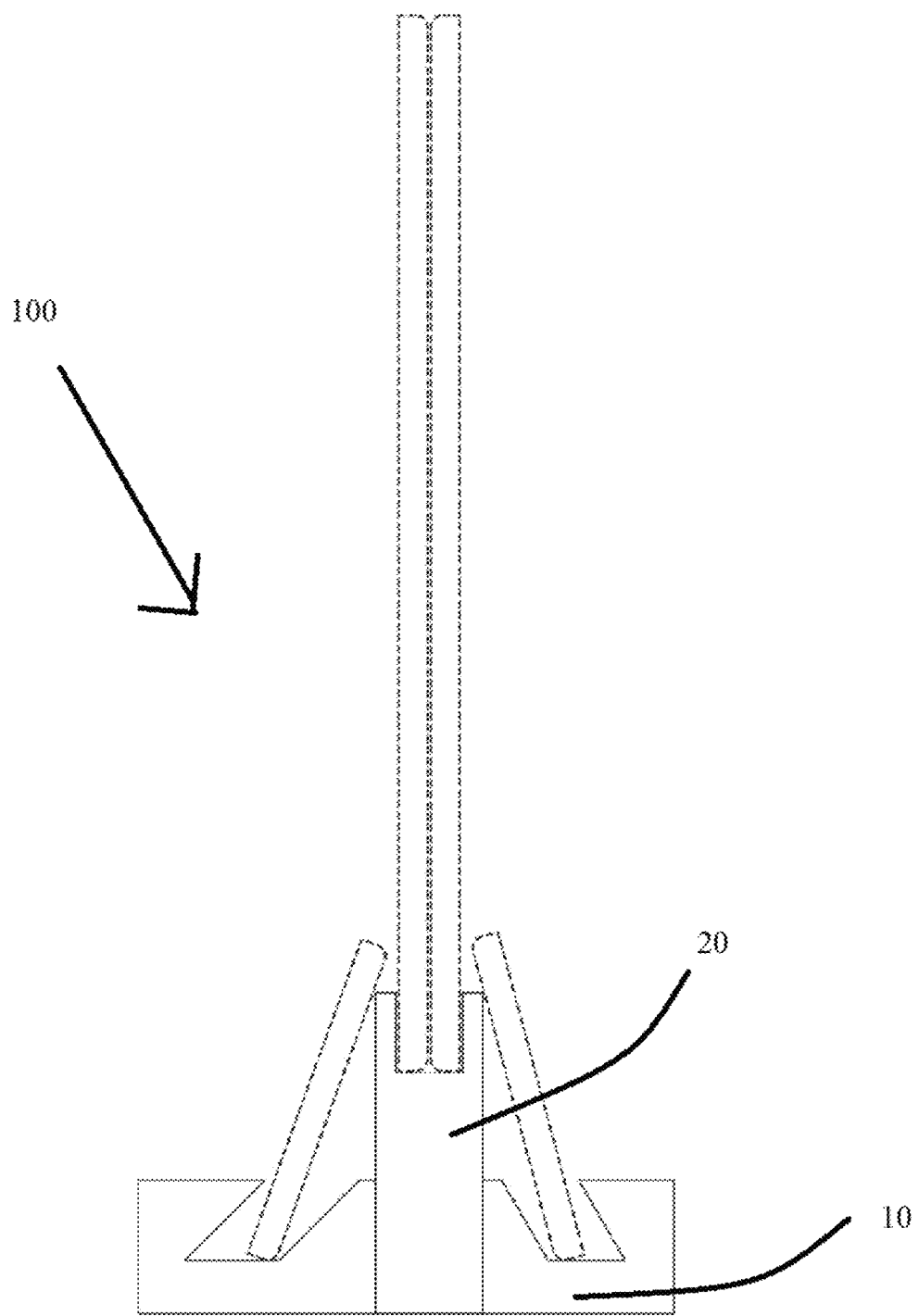
FIG. 4 shows a side view of the present invention, wherein a pair of tablets and a pair of smartphones are mounted on the invention.
Figure 5:
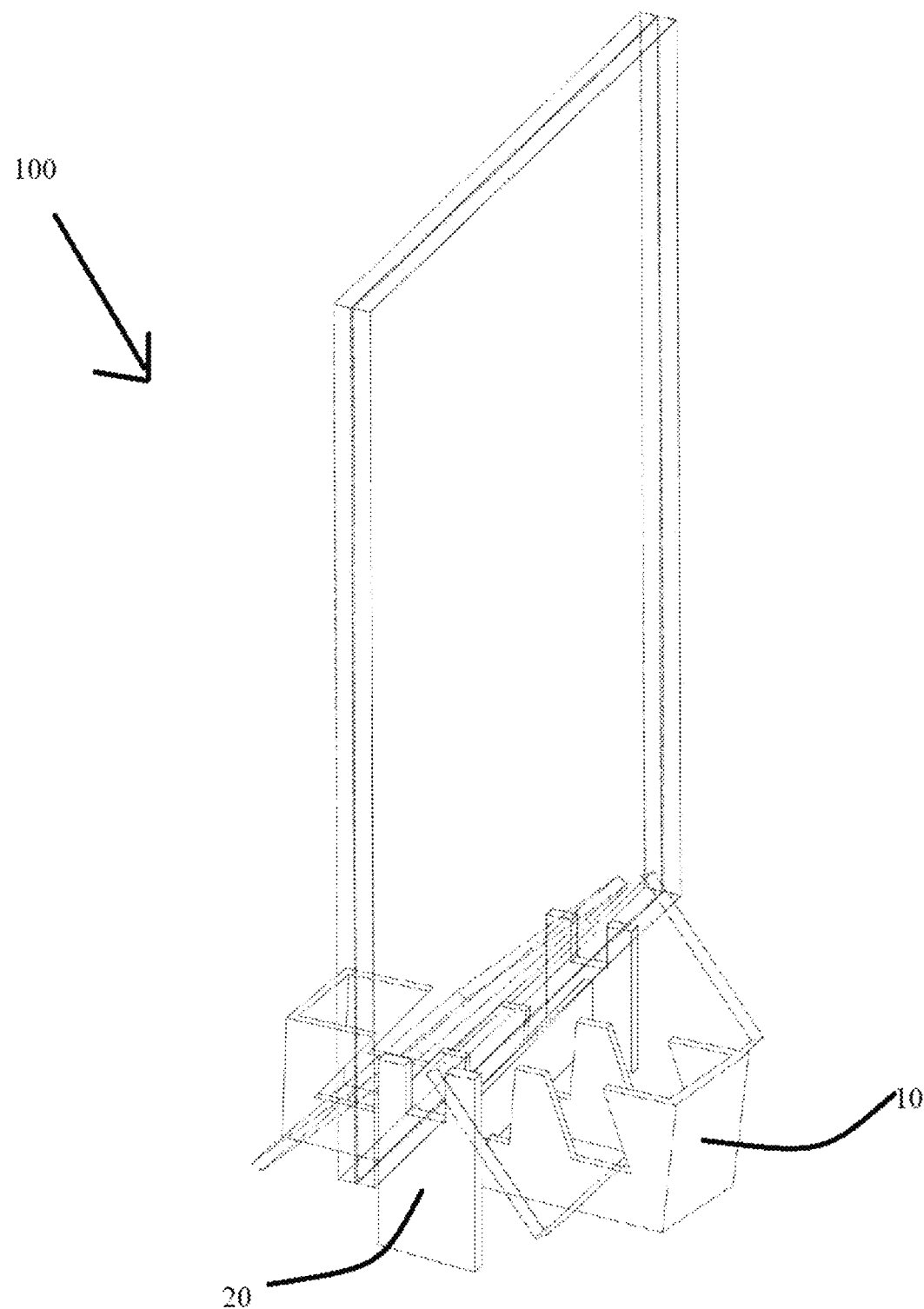
FIG. 5 shows a perspective view of the present invention, wherein a pair of tablets and a pair of smartphones are mounted on the invention.

As seen in FIGS. 1-5, the present invention is a dual tablet and dual smartphone holder 100 that is used to promote an interactive online presentation.

The dual tablet and dual smartphone holder 100 is comprised of a rectangular cuboid 10, wherein a top side 10*a* and a bottom side 10*b* of the rectangular cuboid 10 each define a rectangular aperture extending therebetween and therethrough, the rectangular cuboid 10 has a front side 10*e* and a rear side 10*f,* a left side 10*c* and a right side 10*d* of the rectangular cuboid 10 define an upper central slit 12 and an upper left slanted slit 14 and an upper right slanted slit 16 whereby the tablet or smartphone can be held within the left 14 and the right slanted slits 14, each upper left slanted slit 14 and each upper right slanted slit 16 are defined at locations that are between the front side 10*e* and the upper central slit 12 and the rear side 10*f* and the upper central slit 12, wherein each of the slits extends 14, 16 from the top side 10a of the rectangular cuboid 10 towards the bottom side 10b of the rectangular cuboid 10, and the front side 10e and the rear side 10f of the rectangular cuboid 10 are solid, the upper central slit 12 is at a location that is centered between the front side 10e and the rear side 10f of the rectangular cuboid 10 and the upper central slit extends perpendicular to the top side 10a of the rectangular cuboid 10, the upper central slit is adapted to receive a bridge therein.

An embodiment of the present invention further comprises of a bridge 20, the bridge 20 inserts within the central slit 12 and the bridge 20 defines an upper part 20a that defines an upper channel 20b. In an embodiment of the present invention, the bridge 20 has a left foot extension 22 and a right foot extension 24 that extend outward from the left side 10c and right side 10d of the rectangular cuboid 10.

Figure 6:
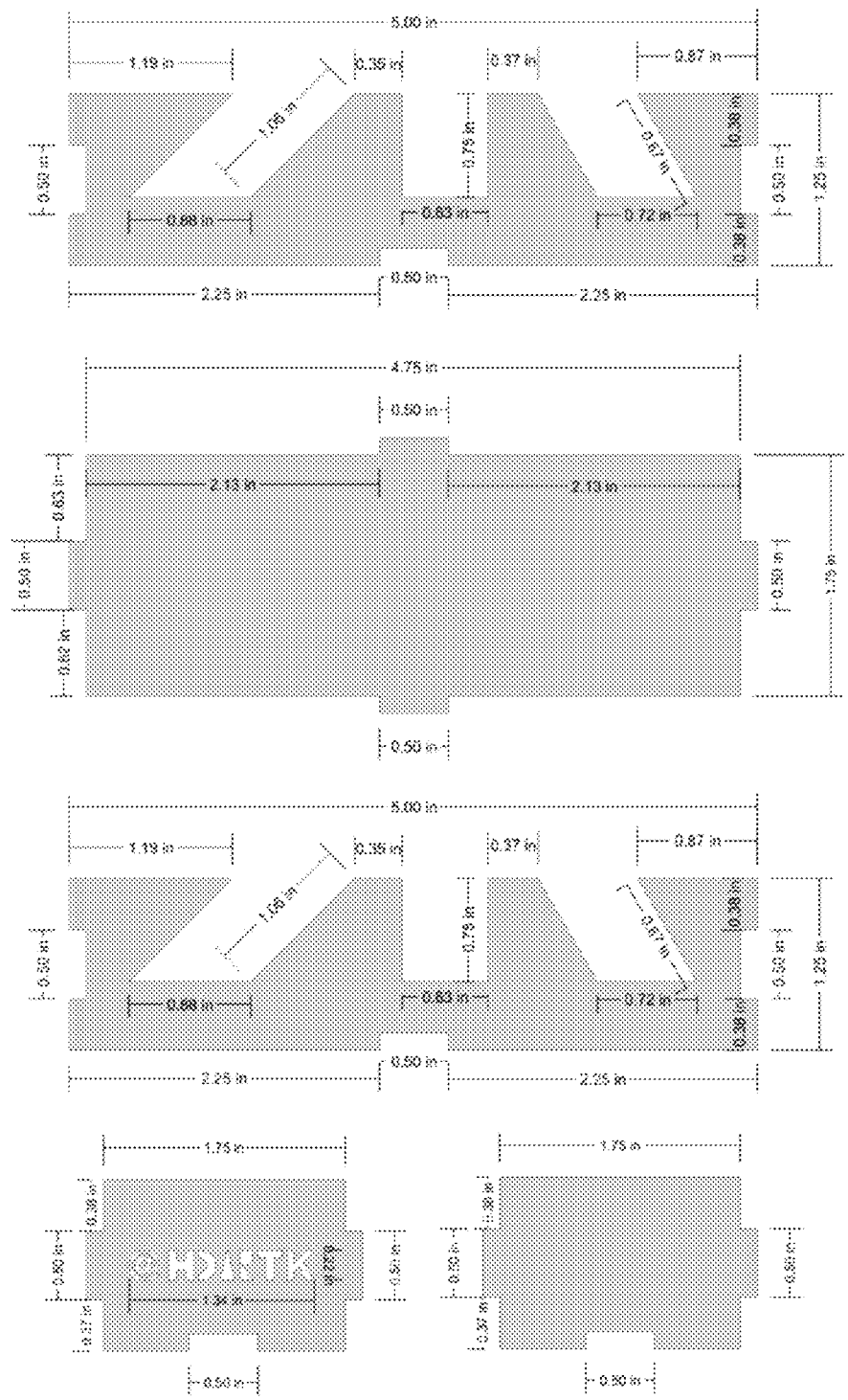
FIG. 6 shows mechanical drawings that disclose the preferred measurements of one of the embodiments of the present invention.

As seen in FIG. 6, in a preferred embodiment the measurements of the rectangular cuboid are the measurements show and described in FIG. 6.

In an embodiment of the present invention, a lower central part 20c of the bridge 20 defines two lower slits 26 that mount on the central slit 12 of the rectangular cuboid 10.

An advantage of the present invention is that it provides a tool that is used to enhance an online education.

Another advantage of the present invention is that it provides a tool that promotes social distancing.

A further advantage of the present invention is that it provides a tool that allows presenters an ability to monitor students' participation when they present an online presentations.

Yet still a further advantage of the present invention is that it provides a tool that students can use when they receive an online education.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. A dual tablet and dual smartphone holder, the holder comprised of a rectangular cuboid, wherein a top side and a bottom side of the rectangular cuboid each define a rectangular aperture extending therebetween and therethrough, the rectangular cuboid has a front side and a rear side, a left side and a right side of the rectangular cuboid define an upper central slit and an upper left slanted slit and an upper right slanted slit whereby the tablet or smartphone can be held within the left and the right slanted slits, each upper left slanted slit and each upper right slanted slit are defined at locations that are between the front side and the upper central slit and the rear side and the upper central slit, wherein each of the slits extends from the top side of the rectangular cuboid towards the bottom side of the rectangular cuboid, and the front side and the rear side of the rectangular cuboid are solid, the upper central slit is at a location that is centered between the front side and the rear side of the rectangular cuboid and the upper central slit extends perpendicular to the top side of the rectangular cuboid, the upper central slit is adapted to receive a bridge therein.

2. The dual tablet and dual smartphone holder of claim 1, further comprised of a bridge, the bridge is placed within the central slit and the bridge defines an upper part that defines an upper channel.

3. The dual tablet and dual smartphone holder of claim 2, wherein the bridge has a left foot extension and a right foot extension that extend outward from the left side and right side of the rectangular cuboid.

4. The dual tablet and dual smartphone holder of claim 3, wherein a lower central part of the bridge defines a pair of lower slits that mount on the upper central slit of the rectangular cuboid.

* * * * *